(12) United States Patent
Bystrom et al.

(10) Patent No.: US 8,630,925 B2
(45) Date of Patent: Jan. 14, 2014

(54) METHOD AND APPARATUS FOR CONTROLLING SERVICE TRAFFIC IN A COMMUNICATION NETWORK

(75) Inventors: Hans Bystrom, Sundbyberg (SE); Victor Ferraro Esparza, Valencia (ES); Niklas Gertoft, Karlskrona (SE); Claes Hempel, Vastra Frolunda (SE); Peter Lindau Nordhammer, Lyckeby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 162 days.

(21) Appl. No.: 13/103,478

(22) Filed: May 9, 2011

(65) Prior Publication Data

US 2012/0259747 A1 Oct. 11, 2012

Related U.S. Application Data

(60) Provisional application No. 61/472,383, filed on Apr. 6, 2011.

(30) Foreign Application Priority Data

Apr. 26, 2011 (EP) ..................................... 11163738

(51) Int. Cl.
*G07B 17/00* (2006.01)
(52) U.S. Cl.
USPC .............................................. 705/30; 705/34
(58) Field of Classification Search
None
See application file for complete search history.

(56) References Cited

U.S. PATENT DOCUMENTS

| 2007/0123213 A1* | 5/2007 | Wu ................................ 455/406 |
| 2008/0046963 A1* | 2/2008 | Grayson et al. .................... 726/1 |
| 2010/0150003 A1* | 6/2010 | Andreasen et al. ............ 370/252 |
| 2011/0270722 A1* | 11/2011 | Cai et al. .......................... 705/34 |

FOREIGN PATENT DOCUMENTS

EP 2 296 309 A1 3/2011

OTHER PUBLICATIONS

Extended European Search Report, EP Application No. 11163738.5, Aug. 22, 2011, 8 pp.
Grgic et al.: "Policy-based charging in IMS for multimedia services with negotiable QoS requirements", CAD Systems in Microelectronics, 2009.CADSM 2009. 10th International Conference—The Experience of Designing and Application of, IEEE, Piscataway, NJ, USA, Jun. 8, 2009, pp. 257-264, XP031514058, ISBN: 978-625-184-130-6.
International Search Report, PCT Application No. PCT/SE2012/050295, Oct. 8, 2012, 4 pp.
Written Opinion of the International Searching Authority, PCT Application No. PCT/SE2012/050295, Oct. 8, 2012, 9 pp.

(Continued)

*Primary Examiner* — Ryan Zeender
*Assistant Examiner* — Kristie A Mahone
(74) *Attorney, Agent, or Firm* — Myers Bigel Sibley & Sajovec, P.A.

(57) ABSTRACT

A method and corresponding apparatus for controlling service traffic in a communication network including an online charging system performing the steps of receiving a request for service traffic control, the request including at least data identifying a first communication network account; determining, based on the received data and a predefined set of rules, a first network traffic policy profile associated with the first account; transmitting to a Policy and Charging Rules Function PCRF a first policy control command including an identifier identifying the first network traffic policy profile stored in an network traffic policy profile entity, to be applied in controlling the service.

26 Claims, 8 Drawing Sheets

(56) References Cited

OTHER PUBLICATIONS

Cheboldaeff, "Interaction between an Online Charging System and a Policy Server", *ICN 2011: The Tenth International Conference on Networks*, Jan. 23-28, 2011, pp. 47-51.

3 GPP, $3^{rd}$ Generation Partnership Project; Technical Specification Group Services and System Aspects; Policy and charging control Architecture (Release 11), 3GPP TS 23.203 V11.1.0, Mar. 2011, 136 pp.

Huawei, "QoS and gating control based on spending limits", 3GPP TD S2-097301, Nov. 16-20, 2009, 2 pp.

* cited by examiner

METHOD AND APPARATUS FOR CONTROLLING SERVICE TRAFFIC IN A COMMUNICATION NETWORK

CROSS-REFERENCE TO RELATED APPLICATIONS

This application claims priority to U.S. Patent Application No. 61/472,383, filed Apr. 6, 2011, and to European Patent Application No. EP11163738.5, filed Apr. 26, 2011, the disclosures of both of which are incorporated by reference herein in their entirety.

FIELD OF INVENTION

The present invention relates to a method and apparatus for controlling service traffic in a communication network.

BACKGROUND

Operators of communication networks face a challenge in how to secure mobile broadband revenues.

The tremendous uptake in mobile broadband subscribers and data volume will require substantial investments in operators' telecom infrastructure. On the other hand, users will expect their operator to deliver the service experience they have paid for. Thus, operator revenues from mobile broadband rely on satisfied customers.

A small fraction of the users generates traffic exceeding those of normal users with magnitude. In many networks, these heavy users are consuming a quite large part of the network resources today. Experience shows that heavy users normally constitutes of 5-10% of the total subscribers, but could consume 70-85% of the network resources. It has been shown that often the heavy users are the biggest consumers of the network resources also during busy hour. With policy control operators can distribute the traffic load more evenly, giving a defined Quality of Service QoS, e.g. more bandwidth resources, for the normal users (the majority of the subscribers), particularly during the busy hour. Policy control also enables operators to push the heavy user traffic into the non-busy hours where number of normal users is lower. For some heavy user applications, time of day is not very critical since they click to download and leave the application running for hours or even days before completing a larger download. Policy control therefore helps controlling network capacity utilization by managing the traffic in a smarter way.

Today and in the future, operators are introducing new premium services, for example ring tones download, TV, video streaming, VoIP, etc. To make sure that the subscribers get the best end user experience while consuming these premium services policy control is used to allocate more bandwidth for these applications when being accessed.

Operators use policy control to move away from a blanket, flat fee for everyone, to the right price for the right service at the right time ensuring users get the user experience paid for. This gives consumers the chance to choose a subscription that best meets their circumstances and decide how to act when the subscription doesn't meet their current, specific needs.

For operators, policy control makes it possible to get the most value from their bandwidth, by leveraging the right price for the right service at the right time.

In order to handle policy control and charging, the 3rd Generation Partnership Project 3GPP has in TS 23.203 specified a policy and charging control PCC functionality encompassing the two main functions:

Flow Based Charging, including charging control and online credit control;

Policy control (e.g. gating control, QoS control, QoS signaling, etc.).

The PCC functionality is comprised by the functions of the Policy and Charging Enforcement Function PCEF, the Bearer Binding and Event Reporting Function BBERF, the Policy and Charging Rules Function PCRF, the Application Function AF, the Online Charging System OCS, the Offline Charging System OFCS and the Subscription Profile Repository SPR or the User Data Repository UDR.

The PCC architecture extends the architecture of an IP Connectivity Access Network IP-CAN, e.g. GPRS, where the PCEF is a functional entity in the gateway node implementing the IP access to the Packet Data Network PDN.

The PCRF is the part of the network architecture that aggregates information to and from the network supporting the creation of rules and then making policy decisions for subscribers active on the network.

However, the 3GPP PCC architecture does not provide for the OCS to enforce a QoS thereby addressing the need for a solution which ensures that a network traffic policy is applied to the users' traffic, with the policy depending on what service the customer has purchased thereby avoiding congestion in the network.

An example is dividing the level of services into service package products such as "gold" (e.g. 3 Mbps, 10 Gb per month), "silver" (e.g. 512 kbps, 1 Gb per month) and "bronze" subscriptions (e.g. 128 kbps, 500 Mb per month), where at a higher cost, faster service and greater available capacity is provided.

A problem is that frequent changes in network traffic policies impacts network behavior thereby risk causing network instability.

SUMMARY OF INVENTION

An object of invention is to provide a method and apparatus for controlling service traffic in a communication network avoiding the above mentioned problem of that changes in network traffic policies impacts network behavior thereby risk causing network instability.

The invention relates to a method for controlling service traffic in a communication network comprising in an online charging system performing the steps of receiving a request for service traffic control, the request including at least data identifying a first communication network account; determining, based on the received data and a predefined set of rules, a first network traffic policy profile associated with the first account; transmitting to a Policy and Charging Rules Function PCRF a first policy control command including an identifier identifying the first network traffic policy profile stored in an network traffic policy profile entity, to be applied in controlling the service.

It may be an advantage of the invention that with the separation of network policy profiles and user policies, the configured network policy profiles can be left unchanged when new end-user offerings are created by the network operator. This means that new types of subscriptions and offers can be implemented quicker and with less network impact.

It may also be an advantage that it is possible to avoid executing selection rules in both a PCRF and an OCS to determine policy data and charging data respectively thereby reducing both computing capacity needs and risk for different decisions due to non-synchronized rules.

It may be another advantage of the invention that when changing charging rates and quality of service for a service, only one system needs to be provisioned.

The method for controlling services in a communication network may comprise before the step of determining a network traffic policy profile determining, based on the received data, a service package associated with said account to which said service relates; and wherein the step of determining the network traffic policy profile comprises the determination being based on an association between said service package and the network traffic policy profile.

This may have the significance that a network policy relevant for the purchased service package product can be identified and applied.

The method for controlling services in a communication network may further comprise also that the received request for service traffic control further includes an access network charging address and an access network charging identifier and the method further comprises the steps: receiving from a Packet Gateway a request for credit control of a service including a packet gateway address and a charging identity; determining a second account to charge for the service; determining that the received requests for service traffic control and credit control relates to the same service instance by matching the access network charging addresses with the packet gateway address and matching the access network charging identifier with the charging identity; determining that the second account to charge differs from the first account; determining, based on the received data and the predefined set of rules, a second network traffic policy profile associated with the second account; and transmitting to the PCRF a second policy control command including an identifier identifying the second network traffic policy profile stored in a second network traffic policy profile entity, to be applied in controlling the service.

This has the advantage that following a charging decision changing the selected account, the network policy relevant for the new selected account may be identified and applied.

Another aspect of the invention relates to an online credit control system OCS for controlling service traffic in a communication network comprising an interface module adapted for receiving a request for service traffic control, the request including at least data identifying a first communication network account. A determination module is adapted for determining, based on the received data and a predefined set of rules, a first network traffic policy profile associated with the first account. The interface module is further adapted for transmitting to a Policy and Charging Rules Function PCRF a first policy control command including an identifier identifying the first network traffic policy profile stored in an network traffic policy profile entity, to be applied in controlling the service.

The OCS may include that the determination module is further adapted to: before determining a network traffic policy profile determining, based on the received data, a service package associated with said account to which said service relates; and wherein determining the network traffic policy profile comprises the determination being based on an association between said service package and the network traffic policy profile.

The OCS may further include that the received request for service traffic control further includes an access network charging address and an access network charging identifier and the system further comprises:

The interface module adapted for receiving from a Packet Gateway a request for credit control of a service including a packet gateway address and a charging identity.

The determination module adapted for: determining a second account to charge for the service; determining that the received requests for service traffic control and credit control relates to the same service instance by matching the access network charging addresses with the packet gateway address and matching the access network charging identifier with the charging identity; determining that the second account to charge differs from the first account; determining, based on the received data and the predefined set of rules, a second network traffic policy profile associated with the second account.

The interface module adapted for transmitting to the PCRF a second policy control command including an identifier identifying the second network traffic policy profile stored in a second network traffic policy profile entity, to be applied in controlling the service.

Embodiments of the invention will now be described in more detail with reference to the enclosed drawings.

DETAILED DESCRIPTION OF THE INVENTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
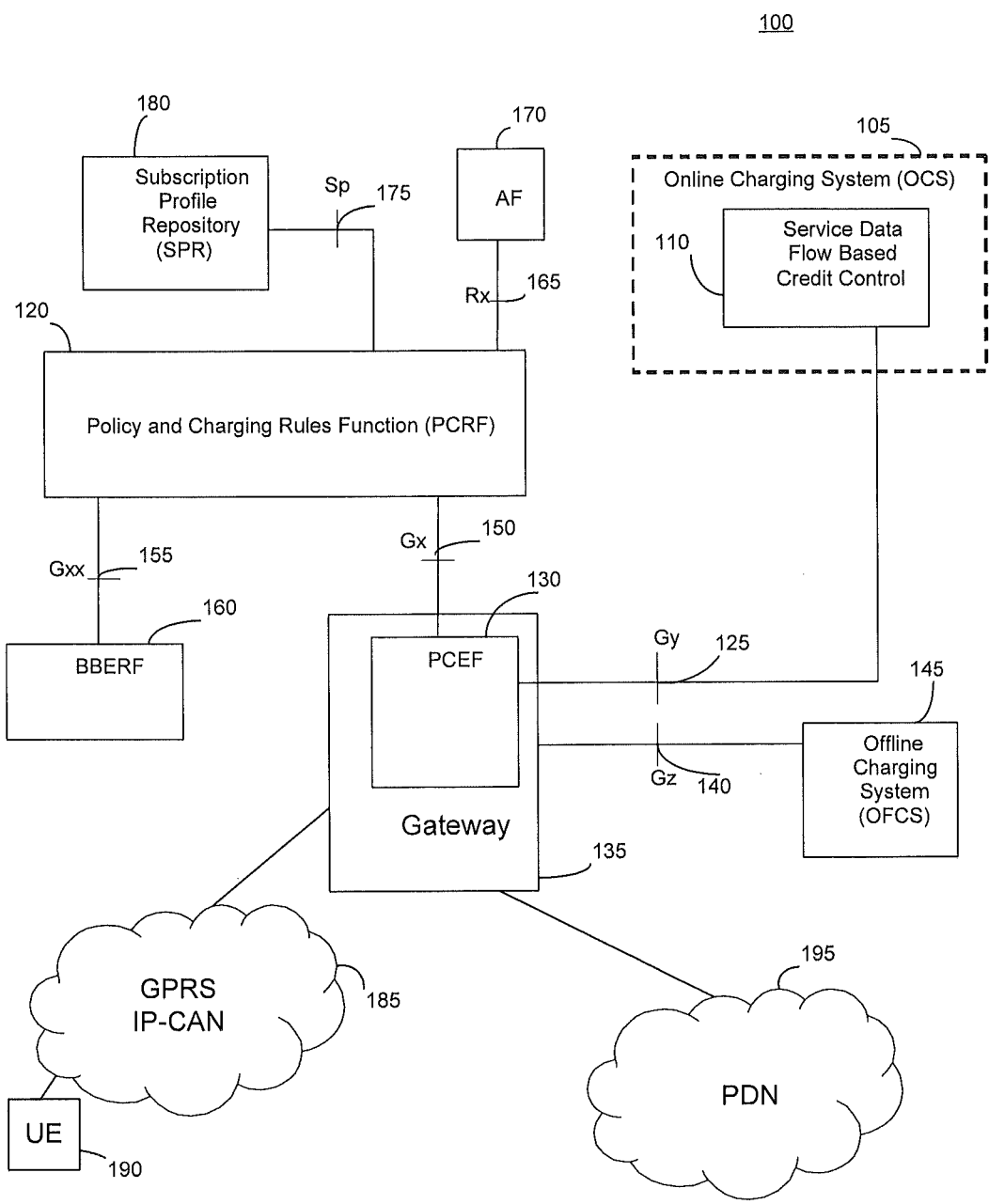
FIG. 1 is a block diagram showing a PCC reference architecture according to the prior art.

FIG. 1 is a block diagram showing a Policy and Charging Control PCC reference architecture 100 according to the prior art 3GPP TS 23.203 allowing a User Equipment UE 190 access to a Packet Data Network PDN 195 via an IP Connectivity Access Network IP-CAN 185, e.g. General Packet Radio Service GPRS.

The Rx reference point 165 connects the Application Function AF 170 and the Policy and Charging Rules Function PCRF 120. This reference point enables transport of application level session information from AF to PCRF The Gx reference point 150 connects the Policy and Charging Enforcement Function PCEF 130 of a gateway 135, e.g. a GPRS Gateway Support Node GGSN, and the PCRF and enables a PCRF to have dynamic control over the PCC behavior at a PCEF. The Gx reference point enables the signaling of PCC decisions, which governs the PCC behavior.

The Gxx reference point 155 connects the Bearer Binding and Event Reporting Function BBERF 160 and the PCRF. The Gxx reference point enables a PCRF to have dynamic control over the BBERF behavior.

The Sp reference point 175 connects the Subscription Profile Repository SPR 180 and the PCRF. The Sp reference point allows the PCRF to request subscription information related to the IP-CAN transport level policies from the SPR based on a subscriber ID, a Packet Data Network PDN identifier and possible further IP-CAN session attributes.

The Gy reference point 125 connects the Service Data Flow Based Credit Control component 110 of an Online Charging System OCS 105 and the PCEF. The Gy reference point allows online credit control for service data flow based charging.

The Gz reference point 140 connects the PCEF and the Offline Charging System OFCS 145 and enables transport of service data flow based offline charging information.

Figure 2:
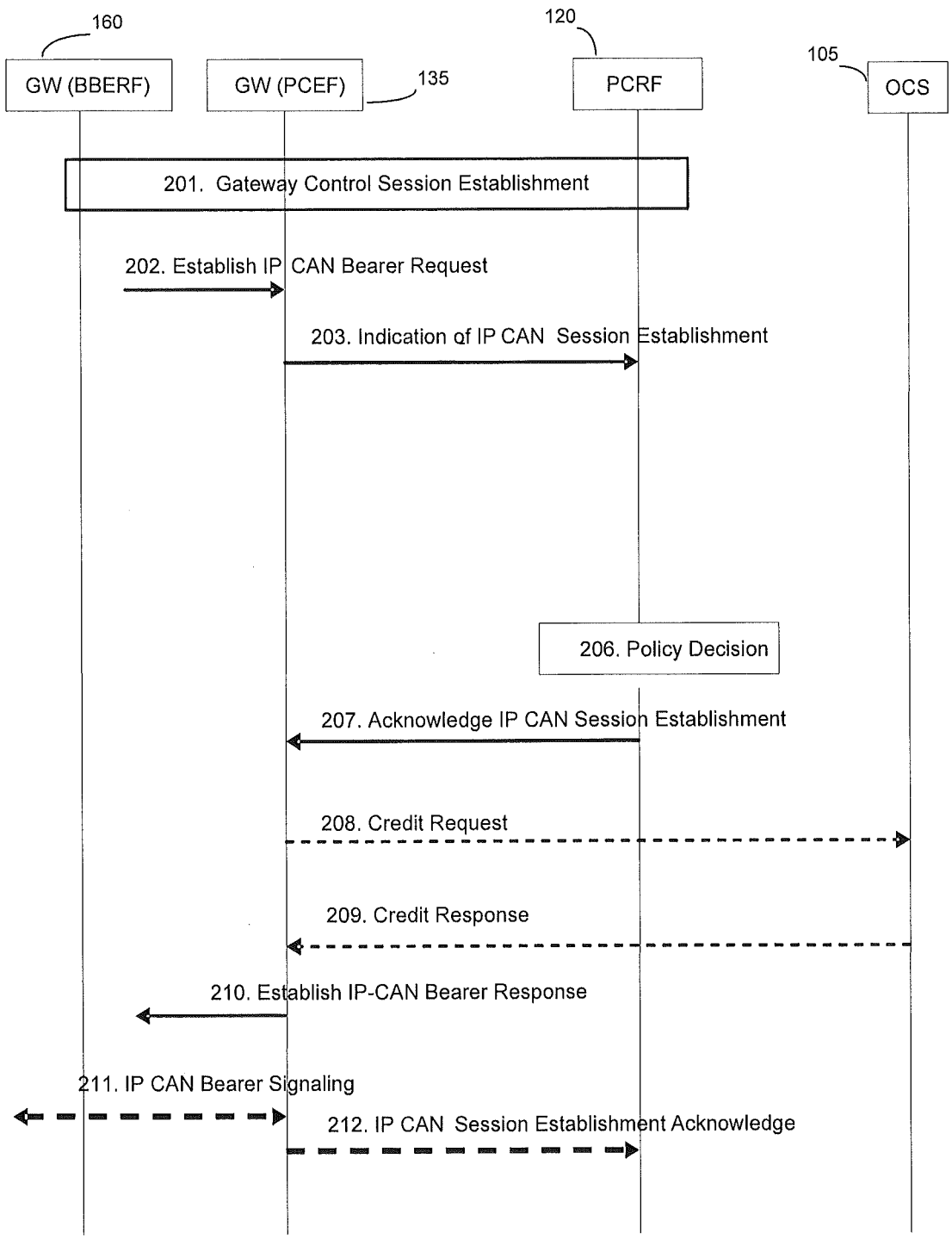
FIG. 2 is a message sequence chart showing an IP-CAN session establishment procedure according to the prior art.

FIG. 2 is a message sequence chart showing an IP-CAN session establishment procedure according to the prior art 3GPP TS 23.203 V10.2.1 (2011-01).

In step 201 the gateway GW control session is established for the user.

The Policy Control Enforcement Function PCEF of the gateway GW(PCEF) receives a request for IP-CAN bearer establishment in step 202 following which the GW(PCEF) accepts the request and assigns an IP address for the user.

The PCEF determines that Policy and Charging Control PCC authorization is required and requests the authorization of allowed service(s) and PCC rules information from the PCRF in step 203.

In step 206 PCRF then makes the authorization and policy decision.

In step 207 the PCRF sends the decision(s), including a chosen IP-CAN bearer establishment mode, to the PCEF where after the GW(PCEF) enforces the decision.

If online charging is applicable, and at least one PCC rule was activated, the PCEF activates the online charging session, and provide relevant input information for the OCS decision in step 208 whereby the OCS provides the possible credit information to the PCEF in step 209.

If at least one PCC rule was successfully activated and if online charging is applicable, and credit was not denied by the OCS, the GW(PCEF) acknowledges the received IP-CAN bearer establishment request in step 210.

In steps 211 the IP-CAN bearer signaling is initiated and the session establishment is acknowledged in step 212.

Figure 3:
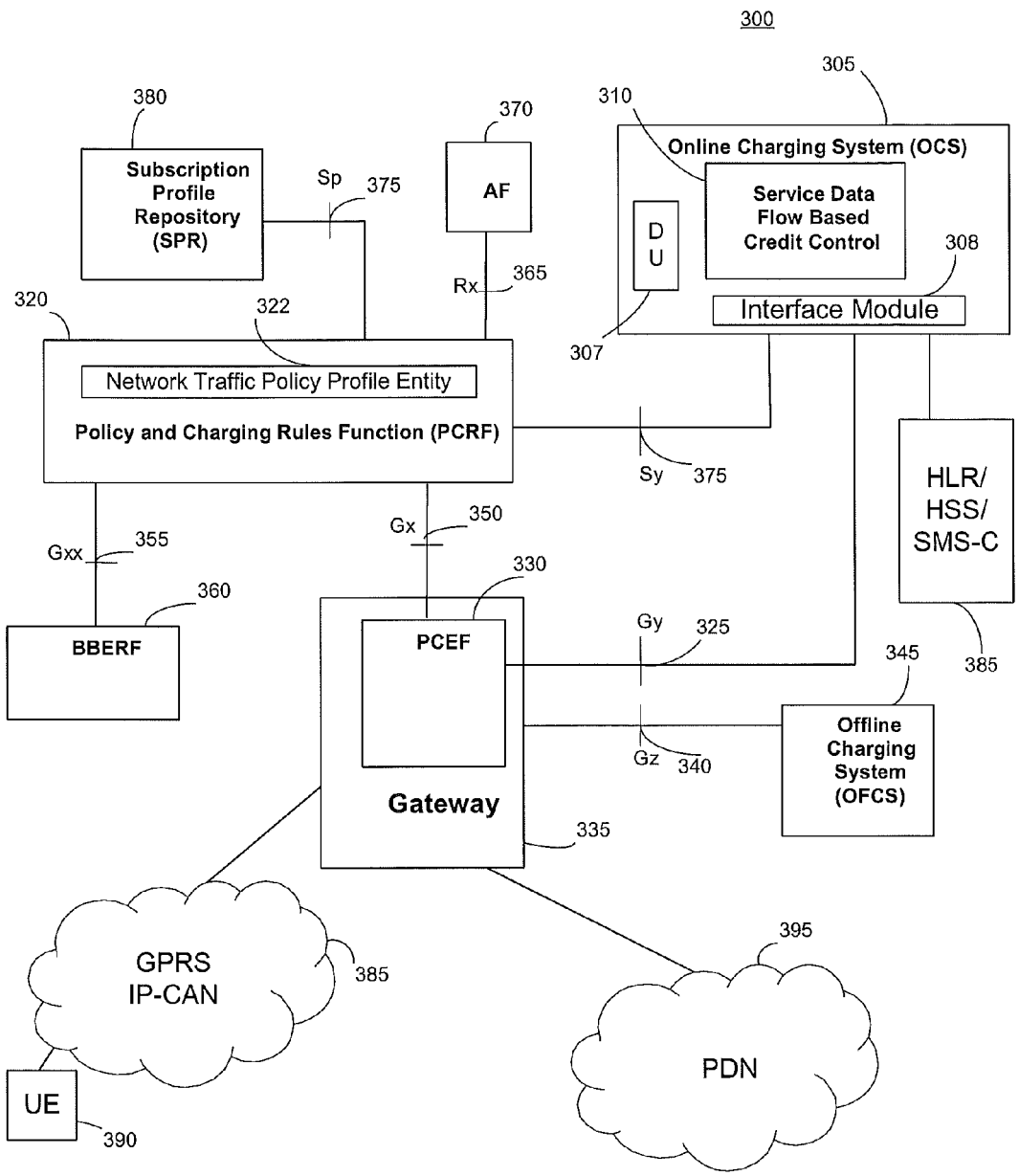
FIG. 3 is a block diagram showing a PCC architecture according to an exemplary embodiment of the invention.

FIG. 3 is a block diagram showing a PCC architecture according to an exemplary embodiment of the invention allowing a user equipment UE 390 access to a Packet Data Network PDN 395 via an IP Connectivity Access Network IP-CAN 385, e.g. GPRS.

The Rx reference point 365 connects the Application Function AF 370 and the Policy and Charging Rules Function PCRF 320. This reference point enables transport of application level session information from AF to PCRF The Gx reference point 350 connects the Policy and Charging Enforcement Function PCEF 330 of a gateway 335, e.g. a GPRS Gateway Support Node GGSN, and the PCRF and enables a PCRF to have dynamic control over the PCC behavior at a PCEF. The Gx reference point enables the signaling of PCC decisions, which governs the PCC behavior.

The Gxx reference point 355 connects the Bearer Binding and Event Reporting Function BBERF 360 and the PCRF. The Gxx reference point enables a PCRF to have dynamic control over the BBERF behavior.

The Sp reference point 375 connects the Subscription Profile Repository SPR 380 and the PCRF. The Sp reference point allows the PCRF to request subscription information related to the IP-CAN transport level policies from the SPR based on a subscriber ID, a Packet Data Network PDN identifier and possible further IP-CAN session attributes.

The Gy reference point 325 connects the Service Data Flow Based Credit Control component 310 of an Online Charging System OCS 305 and the PCEF. The Gy reference point allows online credit control for service data flow based charging.

The Gz reference point 340 connects the PCEF and the Offline Charging System OFCS 345 and enables transport of service data flow based offline charging information.

In order to provide policy information valid for a Gx 350 session to PCRF 320 based on information available in OCS 305 (information like product offerings, time of day based tariff, usage, location etc.) an interface Sy 315 between PCRF and OCS is introduced.

The Sy interface may use existing Diameter base (RFC 3588) and Diameter Credit Control DCC commands (RFC 4006) such as Credit Control Request (CCR), Credit Control Answer (CCA), Re-Authorization Request (RAR) and Re-Authorization Answer (RAA).

The protocol implemented on the Sy interface supports for example sending a Network Traffic Policy Profile NTPP or a parameter identifying such an NTPP stored in a NTPP Entity 322 accessible by the PCRF, as answer to a request from the PCRF.

In the OCS a Policy Data Definition PDD is created in a Determination module DU 307 of the OCS. Based on a configuration of selection rules of the PDD, e.g. selection trees, an NTTP and optionally additional NTPP attributes will be determined by the DU when traversing the selection rules. Thus, in one alternative solution a special rule set separate from the rating rule set, e.g. a special network traffic policy profile rule tree, is introduced in DU for policy profile determination. This policy profile rule tree may then be used for deciding policy both at Sy requests and when rechecking policy after a Gy request.

The NTPP may thus be determined by the policy rule tree, where for example subscriber group defined by Service Class and Offers data are provisioned, and these data can thereby be used to affect the NTPP being selected by being part of the conditions in the policy rule tree structure.

The PCRF uses the chosen NTPP and attributes to set the Quality of Service QoS for a data session.

Data used to determine policy is analyzed by the OCS both at requests received via Sy and Gy interface. Due to this policy data determination may be based on parameters available on both protocols.

For example, the following parameters are common to both protocols:
- 3GPP-Mobile Station MS-TimeZone
- 3GPP-Radio Access Technology RAT-Type
- 3GPP-Serving GPRS Support Node SGSN-Address
- 3GPP-SGSN-Mobile Country Code MCC-Mobile Network Code MNC
- 3GPP-User-Location-Info
- Called-Station-ID
- User-Equipment-Info A request for NTPP determination from the PCRF to the OCS, e.g. a Diameter CCR Initial (See RFC 4006), over Sy may support conveying the following parameters:
- Subscriber-Id
- SGSN-Address, used for deciding the NTPP and attributes in DU SGSN-MCC-MNC (identifies PLMN), used for deciding the NTPP and attributes in DU User Location Information, used for deciding the NTPP and attributes in DU MS-Time-Zone, used for deciding the NTPP and attributes in DU Access Network Charging Identifier Gx and Access Network Charging Address, used for correlation of Sy and Gy sessions in OCS.

An interface module 308 is used to communicate with other function units e.g. PCRF over Sy or PCEF over Gy. The interface module may comprise a LAN/WAN interface or a local connection or bus connecting the OCS to functional units of other physical nodes. The interface module may also comprise a software unit allowing communication with logical functional units residing on the same physical node.

Figure 4:
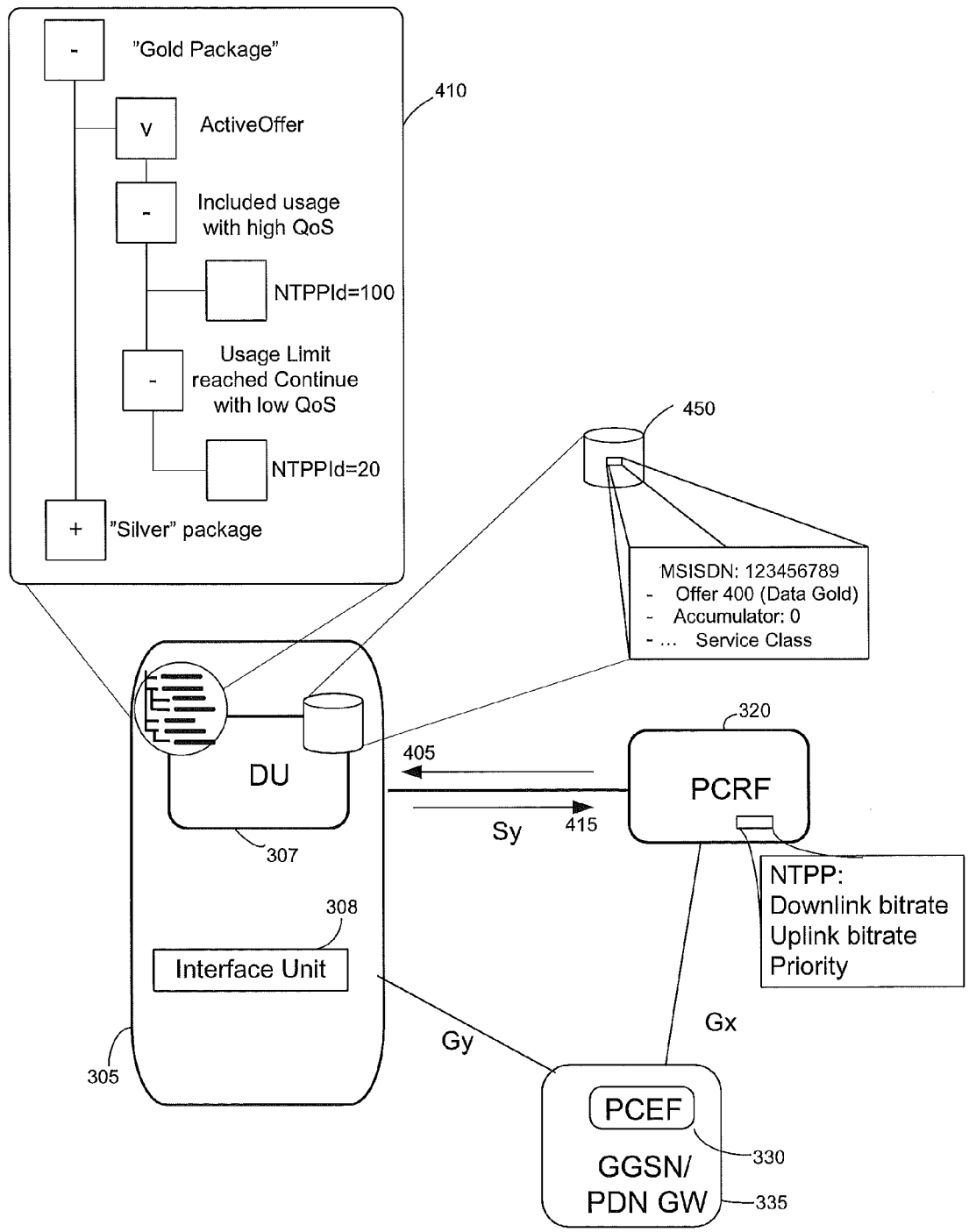
FIG. 4 is a block diagram showing a PCC architecture where exemplary embodiments of the invention is useful.

FIG. 4 is a block diagram showing a PCC architecture where exemplary embodiments of the invention is useful.

Following a policy decision request 405 received over Sy 315 via interface module 308 an Mobile Subscriber ISDN Number MSISDN e.g. 123456789 received in the request is used to access subscriber related data from a database 420 of the DU 307. Access to subscriber related data may include determining service packages as offers subscribed to, e.g. a service "data gold" with the identifier "400", accumulator values storing subscriber parameters, subscriber group data as service class e.g. "Normal Subscriber" etc.

Other subscriber identifiers than MSISDN (E.164) is possible, e.g. International Mobile Subscriber Identity IMSI (E.212), Session Initiated Protocol—Uniform Resource Locator SIP-URI (RFC 3261), Network Access Identifier NAI (RFC 2486) and PRIVATE. In one exemplary solution the identifications are processed in the order that they appear in the id received. The first id that results in "subscriber found" in the database 420 may be used.

The DU 307 holds a Policy Data Definition PDD 410 which may define a plurality of service package products, e.g. the "data gold" product offer "400" offering the user a fixed usage allowance with a higher QoS and when such usage allowance has been consumed the user may continue services with a lower QoS.

Using the subscriber's static or near static data retrieved from the database 450 possibly augmented with dynamic data received via the request 405 the NTPP is determined by applying the selection rules of the PDD 410. E.g. specific NTPP identification "100" is determined. Optionally one or a plurality of additional policy attributes may also be determined by the PDD.

A response message 415 containing the NTPP identifier and optional attributes is then transmitted to the PCRF via interface module 308. The identifier identifies the corresponding NTTP 450 in the PCRF 320 which may define attributes such as uplink bit rate, downlink bit rate, priority etc set to specific values.

In one solution, the response message may comprise a plurality of identifiers identifying a plurality of network traffic policy profiles and a priority value indicating which NTPP to apply when several are applicable to the service.

In a further possible solution, the interface Sy provides for the response message to convey a NTTP including the NTTP identity, should the profile not be available to the PCRF.

The policy attribute(s), which can be added to the NTPP, can be used to extend the NTPP with more dynamic information. An example of this is that an attribute indicates if a subscriber has consumed more or less than the data volume included in a subscription per month.

The policy attribute may also be used to indicate that though the subscriber is a "Normal Subscriber" s(he) has bought a specific service, like a music streaming service, and is entitled to a dedicated bearer for that or otherwise be controlled separately from other traffic within the traffic flow.

The determined NTPP will represent the current policy that is valid for the subscriber at the moment for the request, or in case of time of day conditions as specified by a rule activation and deactivation times.

To minimize request peaks from the PCRF towards the OCS due to policy switches due to time of day conditions a rule activation and deactivation time may be included in the response message to the PCRF. By including two NTPP identifiers in an answer it will be possible to indicate policy before and after a time of day controlled policy switch. If more than one NTPP identifier is included in an answer a rule activation respective deactivation time parameter should preferably be included to indicate the policy active at any moment in time.

A revalidation time parameter may further be added to the response 415 used to indicate when the PCRF at the latest must request a new policy decision. The revalidation time parameter may be controlled from the policy decision tree.

Thus, the NTTP identifier, and where applicable the additional policy attributes, rule activation time, rule de-activation time, revalidation time, priority and additional NTTP identifier is responded back to the PCRF in answer 415.

Figure 5:
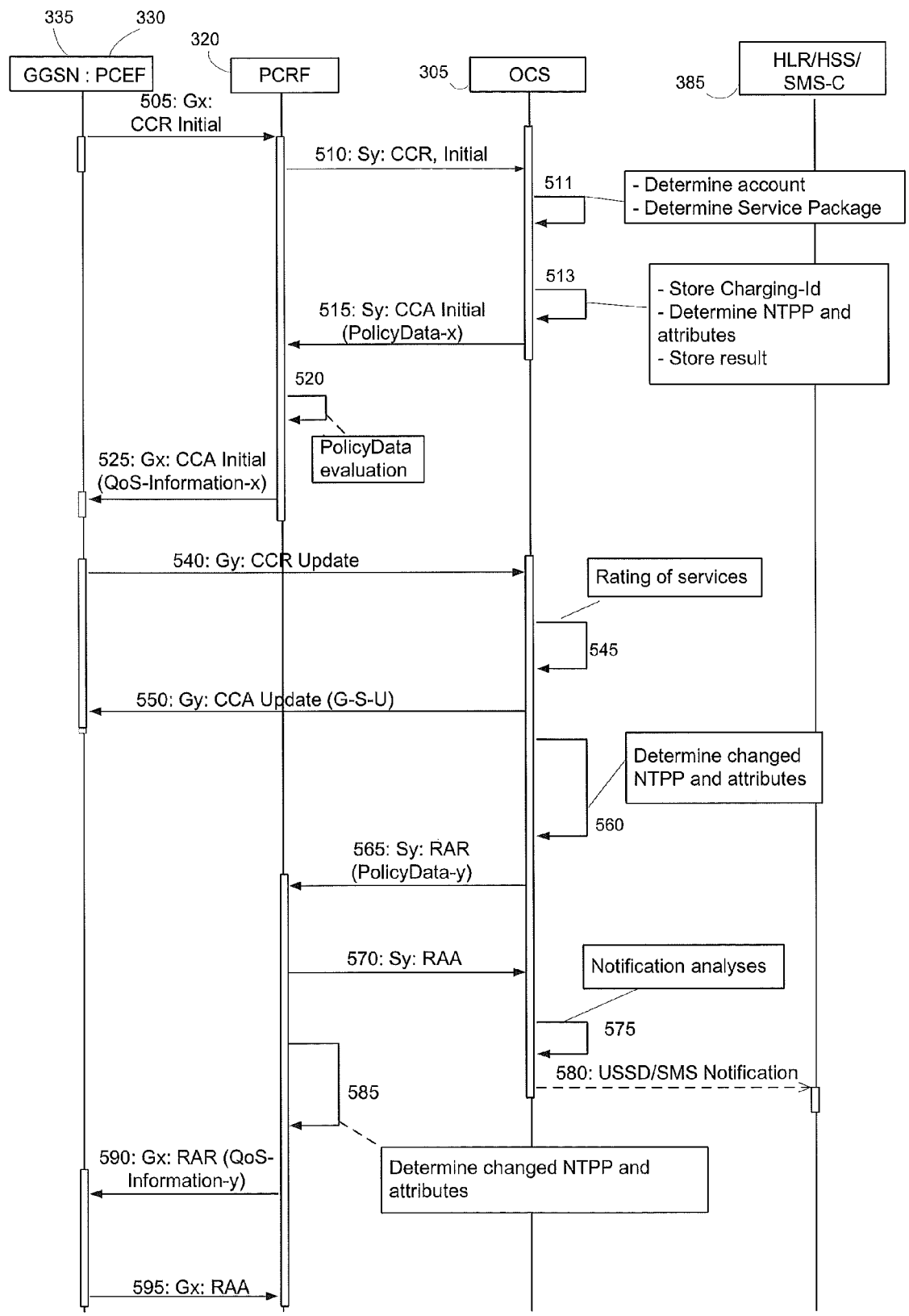
FIG. 5 is a message sequence chart showing a method for controlling services in a communication network according to an exemplary embodiment of the invention.

FIG. 5 is a message sequence chart showing a method for controlling services in a communication network according to an exemplary embodiment of the invention.

In step 505 a Packet Data Protocol PDP context activation triggers the PCEF 330 of the gateway, e.g. GGSN, 335 to request authorization by sending request for service traffic control as a CCR Initial request including for example MSISDN, QoS-Information, Charging Id, SGSN-adress, SGSN-MCC-MNC, User-Location, Time-Zone etc to the PCRF 320.

The OCS receives the Sy CCR Initial request from the PCRF in step 510. In one possible solution the request may include an access network charging address and an access network charging identifier, e.g. an Access-Network-Charging-Identifier-Gx. Parameters in the Sy CCR Initial may include MSISDN, Charging Id, SGSN-Address, SGSN-MCC-MNC, User Location, Time Zone etc.

An advantage with including the two parameter pairs access network charging address and access network charging identifier in the Sy CCR establishment to the OCS it will be possible to connect the Gx and Gy sessions via the Sy session. Hence have the possibility to at an account change due to a Gy CCR trigger the corresponding Gx session for a QoS re-authentication by sending a Sy RAR to the PCRF.

In step 511, using the MSISDN, a subscriber account and associated service packages are identified.

An analysis is done if Access-Network-Charging-Address-Gx is received in the CCR Initial in step 513 and is in such case stored together with an Sy Session Id.

If Access-Network-Charging-Address-Gx is not received over Sy in the CCR Initial, MSISDN/IMSI and Sy Session ID is stored. Data from the Sy request is stored for later usage for Gy session and Re-Authorization Request RAR.

The DU 307 of the OCS is then interrogated for policy determination. Parameters that may be included in the Sy CCR Initial and used in the policy determination are 3GPP-MS-TimeZone
3GPP-RAT-Type
3GPP-SGSN-Address
3GPP-SGSN-MCC-MNC
3GPP-User-Location-Info Called-Station-ID
RAT-Type
User-Equipment-Info The values to use for each parameter may be taken from the latest request where they were included, i.e. the values used in a policy decision can come from a mix of Sy and Gy requests.

The network traffic policy profile and attributes associated with the account is then determined based on the data received in the request and/or account data and stored. Examples of account data are service packages or subscriber group data, e.g. Service Class, associated with the account.

In step 515 the OCS sends a policy control command over Sy as a CCA Initial response to the PCRF including an NTTP identifier as policy data and optionally an event trigger. Transmitting a policy control command may include determining if the identified NTPP is stored in the NTPP Entity, and if not, transmitting said NTTP to the PCRF for storage in the NTTP entity. The identifier is identifying a network traffic policy profile stored in a network traffic policy profile entity so that it may be applied in controlling the service.

In step 520 the received policy data, e.g. NTPP identifier, is evaluated by the PCRF to obtain policy parameters stored in the NTTP Entity identified by the identifier.

In step 525 the PCRF responds with a CCA Initial over Gx to the PCEF providing the policy information, e.g. QoS parameters and event trigger.

In step 540 a credit control request is received from a packet gateway and includes a packet gateway address and a charging identity. The credit control request may be a CCR Update over Gy received from a GGSN where the packet gateway address is a 3GPP-GGSN-Adress and the charging identity is a 3GPP-Charging-Id. The request may include MSISDN, Charging-Id, MSCC, Requested Service Units RSU and used units.

In step 545 the DU determines an account to charge for the service and performs rating of the services.

In step 550 the OCS sends Granted Service Units GSU to the GGSN in a CCA Update over Gy.

In step 560 the following analysis is done in OCS:

If Charging ID or MSISDN/IMSI received in the Gy CCR Update exists, the DU 307 is interrogated for corresponding Sy session. This is done in order to get more accurate policy analysis in DU by considering Gy dynamic data like location, SGSN address etc.

The access network charging addresses is matched with the packet gateway address and the access network charging identifier is matched with the charging identity to determine that the received requests for service traffic control and credit control relates to the same service instance.

In one embodiment it is determined that the received requests for service traffic control over Sy and credit control request over Gy relates to the same service instance by matching the IMSI and/or MSISDN received in the request for service traffic control with the IMSI and/or MSISDN received in the request for credit control;

It is checked if the account to charge differs from the account determined in step 511.

Thereafter, the DU is interrogated for policy, i.e. NTPP, determination. The DU determines based on the received data and the predefined set of rules, a network traffic policy profile associated with the determined account to charge. The DU does policy analysis based on dynamic data received (like location, time zone, SGSN address etc). Upon receiving answer from DU with policy data the OCS compares the policy data received from DU with policy data stored. If these differ, a RAR towards PCRF should be initiated and new policy data should be stored.

Thus, after each Gy request a new policy decision may be made to check if the present policy has changes due to Used-Service-Units from the Gy request, due to other events on the account or changes on the UE's attributes (radio access type, location, etc.).

The OCS may save all Sy parameters, per session, that are available as conditions in the policy determination so that they can be used at policy re-evaluation following a Gy request.

In step 565 the CCN initiates sending of Sy RAR to the PCRF including the new policy data, i.e. NTPP identifier, to be applied in controlling the service.

In step 570 the OCS receives a RAA over Sy.

In step 575 the DU performs analysis if the change of policy should be notified to end user by sending Unstructured Supplementary Service Data USSD or Short Message Service SMS message e.g. information that a threshold is passed.

In step 580, if applicable, the OCS initiates the notification towards the user using e.g. USSD or SMS.

In step 585 the PCRF makes the policy evaluation based on the information received from OCS.

If the policy, i.e. NTPP and/or attributes, is changed the PCRF initiates RAR with new QoS in step 590 to the PCEF over Gx.

In step 595 PCEF acknowledges using RAA.

Additionally, the described solution may advantageously be used where, instead of being triggered by the PCRF in step 510, the triggering is received as a CCR Initial from the PCEF over Gy, or as a CCR Update received over Gy allowing the OCS to initiate the session to provision an NTPP identifier to PCRF when spending limits are reached mid-session. Re-authorization procedure (RAR/RAA) initiated from OCS may be used for this.

Figure 6:
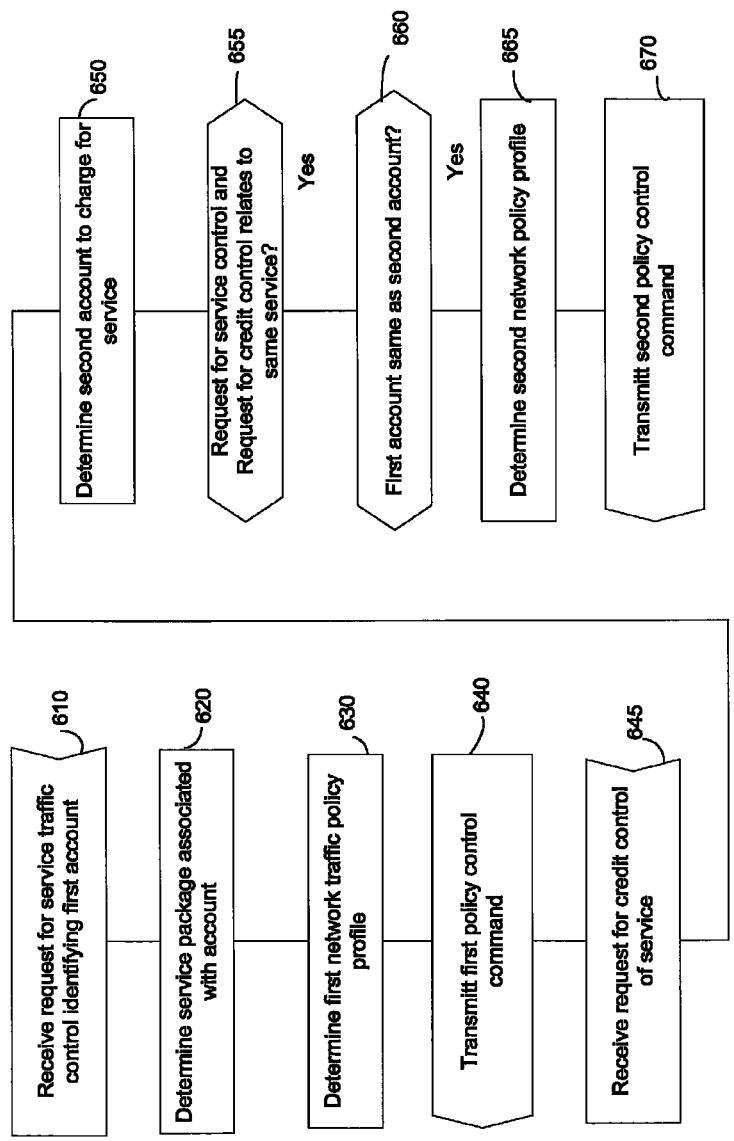
FIG. 6 is a flow chart showing an exemplary embodiment of a method for controlling services in a communication network according to the invention.

FIG. 6 is a flow chart showing an exemplary embodiment of a method for controlling services in a communication network according to the invention. In step 610 the OCS receives a request for service traffic control identifying a first account. A service package associated with the account is identified in step 620. In step 630 a first network traffic policy profile is determined which the OCS transmits as a first policy control command in step 640.

In step 645 a request for credit control of a service is received. A second account to charge for service is determined in step 650. In step 655 it is checked if the request for service traffic control and the request for credit control relates to the same service instance.

If the check is confirming that the request for service traffic control and the request for credit control relates to the same service instance the method continues in step 660 with checking if the first account differs from the second account.

If the first and second differs, the method continues in step 665 with determining a second network traffic policy applicable for the second account.

In step 670 as second policy control command is transmitted identifying a second NTPP.

Figure 7:
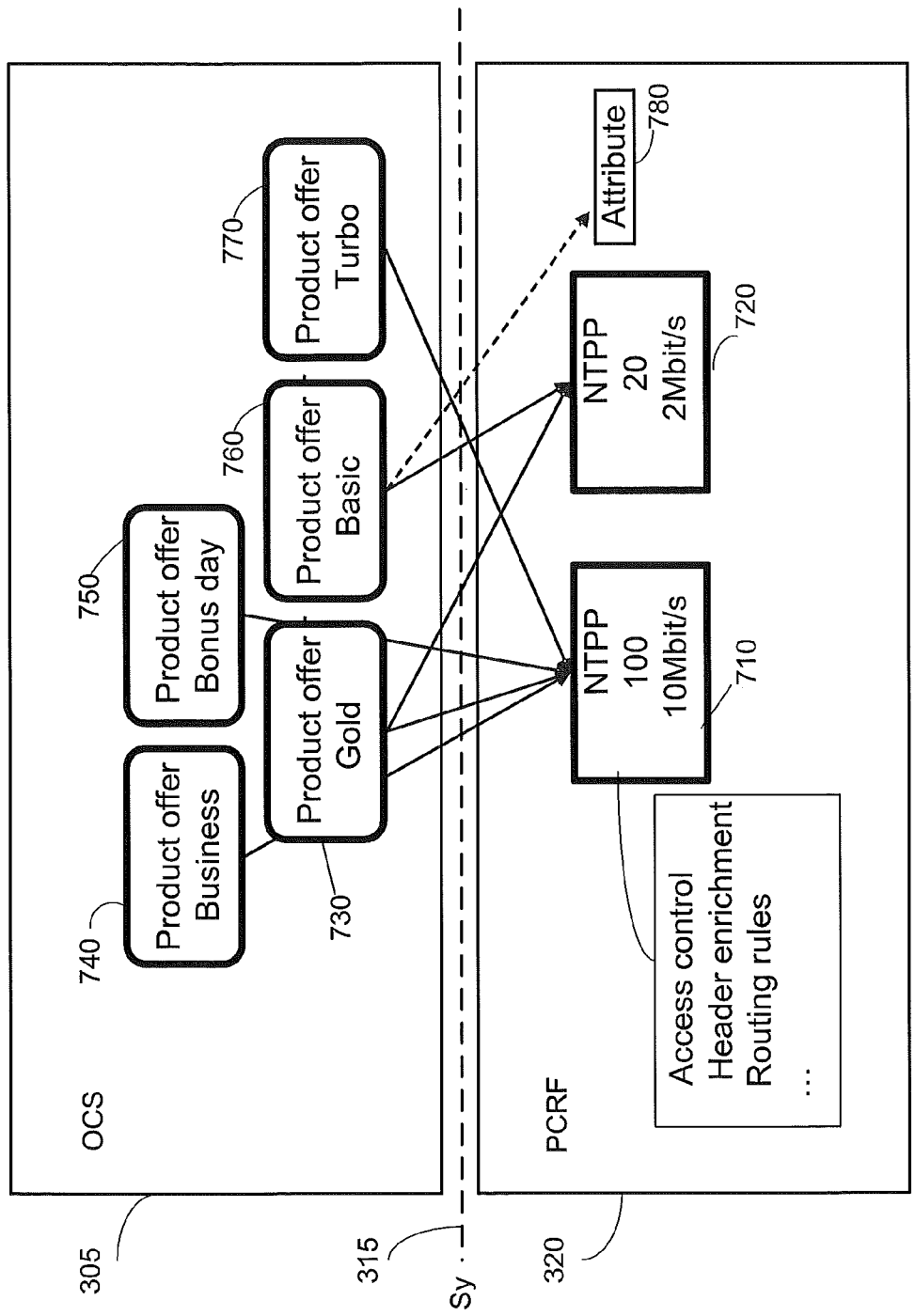
FIG. 7 is a block diagram showing relations between service package products and network traffic policy profiles according to an exemplary embodiment of the invention.

FIG. 7 is a block diagram showing relations between service package products and network traffic policy profiles according to an exemplary embodiment of the invention.

Network Traffic Policy Profile NTPPs such as "100" 710 and "20" 720 are stored in the PCRF 320 while product offers as service package products are stored with the OCS 305. By identifying a user's service package product the relevant NTPP is identified and a parameter identifying this profile may be transmitted to the PCRF 320 over the interface Sy 315.

A Network Traffic Policy Profile NTPP "100" 710 including policy parameters such as access control, header enrichment, routing rules, transmission speed—e.g. 10 Mbit/s may be associated with several service package products for example a Bonus Day 750, Gold 730, Business 740 or Turbo 770 offers. Correspondingly, a service package product 730 may utilize several NTPPs "100" 710 and "20" 720 to be applied depending on e.g attributes 780.

In addition, attributes 780 are utilized to limit the number of NTPPs needed. For a certain parameter in the NTPP, e.g. bandwidth, the parameter's value is represented in the attribute. This enables a change of attribute parameter value, without the need to change NTPP.

Figure 8:
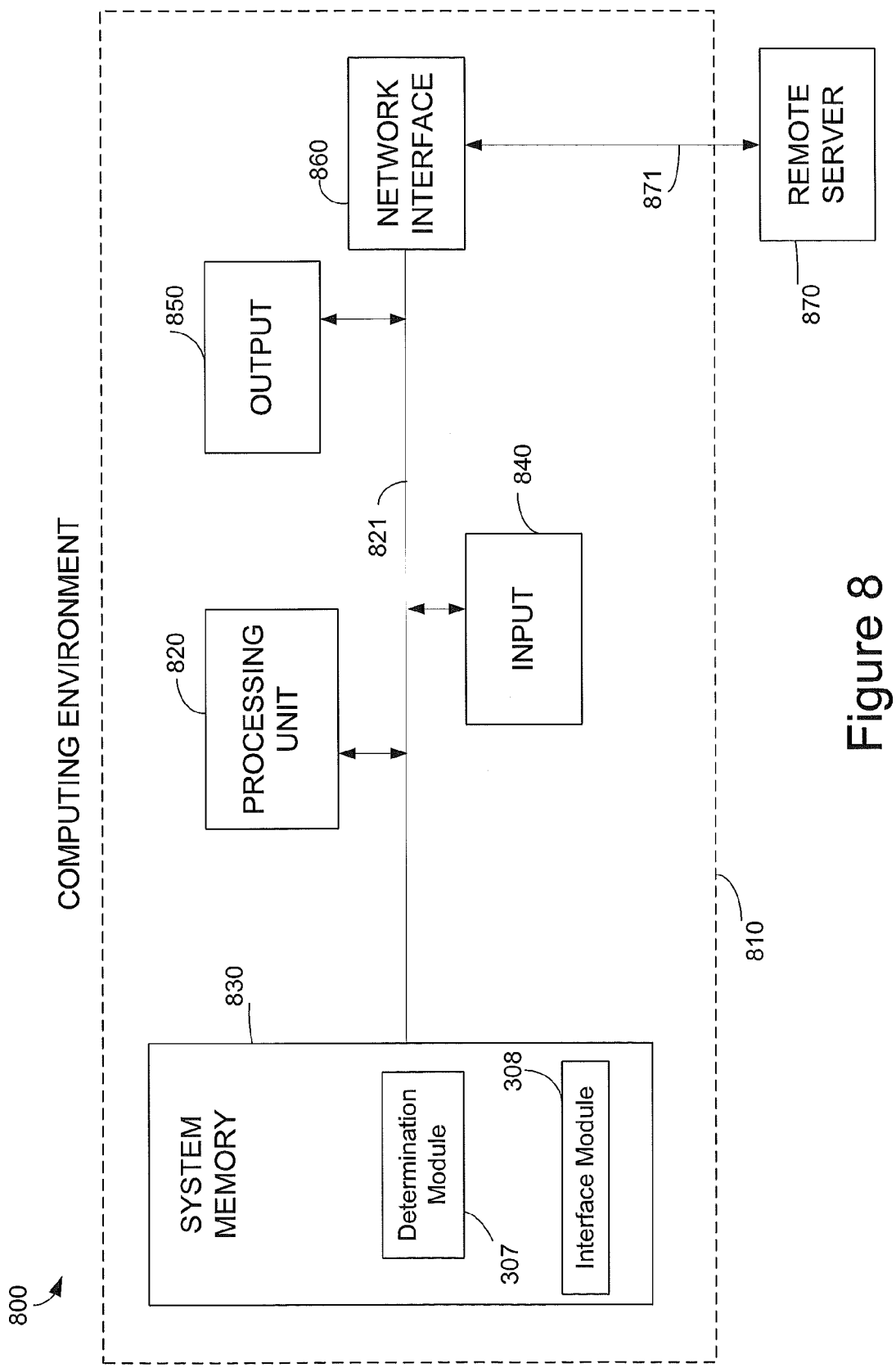
FIG. 8 is a block diagram showing an exemplary computing device for implementing a system for controlling services in a communication network according to an exemplary embodiment.

FIG. 8 is a block diagram showing an exemplary computing device for implementing a system for controlling services in a communication network according to an exemplary embodiment.

FIG. 8 illustrates an example of a suitable computing system environment 800 in which the claimed subject matter can be implemented, although as made clear above, the computing system environment 800 is only one example of a suitable computing environment for an Online Charging System and is not intended to suggest any limitation as to the scope of use or functionality of the claimed subject matter. Further, the computing environment 800 is not intended to suggest any dependency or requirement relating to the claimed subject matter and any one or combination of components illustrated in the example operating environment 800.

Looking now to FIG. 8, an example of a device for implementing the previously described invention includes a general purpose computing device in the form of a computer 810. Components of computer 810 can include, but are not limited to, a processing unit 820, a system memory 830, and a system bus 821 that couples various system components including the system memory to the processing unit 820. The system bus 821 can be any of several types of bus structures including a memory bus or memory controller, a peripheral bus, and a local bus using any of a variety of bus architectures.

Computer 810 can include a variety of computer readable media. Computer readable media can be any available media that can be accessed by computer 810. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media can embody computer readable instructions, data structures, program modules or other data in a modulated data signal such as a carrier wave or other transport mechanism and can include any suitable information delivery media.

The system memory 830 can include computer storage media in the form of volatile and/or nonvolatile memory such as read only memory (ROM) and/or random access memory (RAM). A basic input/output system (BIOS), containing the basic routines that help to transfer information between elements within computer 810, such as during start-up, can be stored in memory 830. Memory 830 can also contain data and/or program modules that are immediately accessible to and/or presently being operated on by processing unit 820. By way of non-limiting example, memory 830 can also include an operating system, application programs, other program modules, and program data.

In one embodiment of the invention the Interface Module 308 is a function block loaded in the memory and processable by the processing unit whereby the OCS is having the ability to receive a request for service traffic control, the request including at least data identifying a first communication network account and the Determination Module 307 is a function block loaded in the memory and processable by the processing unit whereby the OCS is having the ability to determine, based on the received data and a predefined set of rules, a first network traffic policy profile associated with the first account. The Interface Module function block further has the ability to transmit to a Policy and Charging Rules Function PCRF a first policy control command including an identifier identifying the first network traffic policy profile stored in an network traffic policy profile entity, to be applied in controlling the service.

The computer 810 can also include other removable/non-removable and volatile/nonvolatile computer storage media. For example, computer 810 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 821 through a non-removable memory interface such as an interface, and a magnetic disk drive or optical disk drive can be connected to the system bus 821 by a removable memory interface, such as an interface.

A user can enter commands and information into the computer 810 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 820 through user input 840 and associated interface(s) that are coupled to the system bus 821, but can be connected by other interface and bus structures, such as a parallel port, game port or a universal serial bus (USB).

A graphics subsystem can also be connected to the system bus 821. In addition, a monitor or other type of display device can be connected to the system bus 821 through, an interface, such as output interface 850, which can in turn communicate with video memory. In addition to a monitor, computers can also include other peripheral output devices, such as speakers and/or printing devices, which can also be connected through output interface 850.

The computer 810 can operate in a networked or distributed environment using logical connections to one or more other remote computers, such as remote server 870, which can in turn have media capabilities different from device 810. The remote server 870 can be a personal computer, a server, a router, a network PC, a peer device or other common network node, and/or any other remote media consumption or transmission device, and can include any or all of the elements described above relative to the computer 810. The logical connections depicted in FIG. 8 include a network 871, such as a local area network (LAN) or a wide area network (WAN), but can also include other networks/buses.

When used in a LAN networking environment, the computer 810 is connected to the LAN 871 through a network interface or adapter 860. When used in a WAN networking environment, the computer 810 can include a communications component, such as a modem, or other means for establishing communications over a WAN, such as the Internet. A communications component, such as a modem, which can be internal or external, can be connected to the system bus 821 through the user input interface at input 840 and/or other appropriate mechanism.

In a networked environment, program modules depicted relative to the computer 810, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method performed by a network node for operating an online charging system to control service traffic in a communication network, wherein the network node comprises a computing device, the method comprising steps of:

receiving, by the computing device, a request for service traffic control, the request including at least data identifying a first communication network account;

determining, by the computing device, based on the received data and a predefined set of rules, a first network traffic policy profile associated with the first account;

transmitting, by the computing device, to a Policy and Charging Rules Function (PCRF) a first policy control command including an identifier identifying the first network traffic policy profile stored in an network traffic policy profile entity, to be applied in controlling the service;

receiving, by the computing device, from a Packet Gateway a request for credit control of a service including a second subscriber identity;

determining, by the computing device, using the second subscriber identity, a second account to charge for the service;

determining, by the computing device, that the request for service traffic control and the request for credit control relate to the same service instance by matching the first and second subscriber identities;

determining, by the computing device, that the second account to charge differs from the first account;

determining, by the computing device, based on the received data and the predefined set of rules, a second network traffic policy profile associated with the second account; and transmitting, by the computing device, to the PCRF a second policy control command including an identifier identifying the second network traffic policy profile stored in a second network traffic policy profile entity, to be applied in controlling the service.

2. A method according to claim 1 wherein:
before the step of determining a network traffic policy profile, determining, based on the received data, a service package associated with said account to which said service relates; and
wherein the step of determining the network traffic policy profile comprises the determination of the network traffic policy profile being based on an association between said service package and the network traffic policy profile.

3. A method performed by a network node for operating an online charging system to control service traffic in a communication network, wherein the network node comprises a computing device, the method comprising steps of:
receiving, by the computing device, a request for service traffic control, the request including at least data identifying a first communication network account and an access network charging address and an access network charging identifier;
determining, by the computing device, based on the received data and a predefined set of rules, a first network traffic policy profile associated with the first account;
transmitting, by the computing device, to a Policy and Charging Rules Function (PCRF) a first policy control command including an identifier identifying the first network traffic policy profile stored in an network traffic policy profile entity, to be applied in controlling the service;
receiving, by the computing device, from a Packet Gateway a request for credit control of a service including a packet gateway address and a charging identity;
determining, by the computing device, a second account to charge for the service;
determining, by the computing device, that the request for service traffic control and the request for credit control relate to the same service instance by matching the access network charging addresses with the packet gateway address and matching the access network charging identifier with the charging identity;
determining, by the computing device, that the second account to charge differs from the first account;
determining, by the computing device, based on the received data and the predefined set of rules, a second network traffic policy profile associated with the second account; and
transmitting, by the computing device, to the PCRF a second policy control command including an identifier identifying the second network traffic policy profile stored in a second network traffic policy profile entity, to be applied in controlling the service.

4. A method according to claim 1 wherein the identifier identifying the second network traffic policy profile is sent as a DIAMETER Re-Authentication-Request.

5. A method according to claim 1 wherein the step of determining a first network traffic policy profile is further based on account data.

6. A method according to claim 5 wherein the account data comprises data identifying subscriber group and/or data specifying services associated with the account.

7. A method according to claim 1 wherein the step of determining a first and/or second network traffic policy profile is further based on data received from the Packet Gateway in the request for credit control.

8. A method according to claim 1 wherein the network traffic policy profile contains a quality of service parameter of bandwidth and/or priority that is to a particular value.

9. A method according to claim 1 wherein the network traffic policy profile contains at least a parameter indicating that a type of traffic within a traffic flow should be service traffic controlled separately from other traffic within the traffic flow.

10. A method according to claim 1 wherein the network traffic policy profile is associated with one or more service packages.

11. A method according to claim 1 wherein a service package is associated with several network traffic policy profiles.

12. A method according to claim 1 wherein the step of transmitting a policy control command further comprises determining if the identified network traffic policy profile is stored in the network traffic policy profile Entity, and if not, transmitting said network traffic policy profile to the PCRF for storage in the network traffic policy profile entity.

13. A method according to claim 1 wherein the request for service traffic control is a Diameter Credit Control Request command.

14. A method according to claim 1 wherein the policy control command further comprises a network traffic policy profile activation and/or deactivation time parameter.

15. A method according to claim 1 wherein the policy control command further comprises an indicator indicating that resources beyond or below a threshold has been consumed from the account.

16. A method according to claim 1 wherein the policy control command further comprises a revalidation time indicating when the PCRF must send a new request for service traffic control.

17. A method according to claim 1 wherein the first policy control command further comprises a plurality of identifiers identifying a plurality of network traffic policy profiles and a priority value indicating which network traffic policy profile to apply when several are applicable to the service.

18. An online credit control system for controlling service traffic in a communication network, wherein the online credit control system comprises a computing device, wherein the computing device further comprises:
an interface module configured to receive a request for service traffic control, the request including at least data identifying a first communication network account, an access network charging address and an access network charging identifier; and
a determination module configured to determine, based on the received data and a predefined set of rules, a first network traffic policy profile associated with the first account;
the interface module further configured to transmit to a Policy and Charging Rules Function (PCRF) a first policy control command including an identifier identifying the first network traffic policy profile stored in an network traffic policy profile entity, to be applied in controlling the service;
the interface module configured to receive from a Packet Gateway a request for credit control of a service including a packet gateway address and a charging identity;
the determination module configured to:
determine a second account to charge for the service;
determine that the request for service traffic control and the request for credit control relate to the same service instance by matching the access network charging addresses with the packet gateway address and matching the access network charging identifier with the charging identity:
  determine that the second account to charge differs from the first account;
  determine, based on the received data and the predefined set rules, a second network traffic policy profile associated with the second account; and
the interface module configured to transmit to the PCRF a second policy control command including an identifier identifying the second network traffic policy profile stored in a second network traffic policy profile entity, to be applied in controlling the service.

19. An online credit control system according to claim 18 wherein the determination module is further adapted to:
  before carrying the determining the first network traffic policy profile, determining based on the received data a service package associated with said account to which said service relates; and
  wherein determining the first network traffic policy profile is carried out based on an association between said service package and the network traffic policy profile.

20. An online credit control system according to claim 18 wherein the determining a first and/or second network traffic policy profile is further based on data received from the Packet Gateway in the request for credit control.

21. An online credit control system according to claim 18 wherein the network traffic policy profile contains at least a parameter indicating that a type of traffic within a traffic flow should be service traffic controlled separately from other traffic within the traffic flow.

22. An online credit control system according to claim 18 wherein the network traffic policy profile is associated with one or more service packages.

23. An online credit control system according to claim 18 wherein a service package is associated with several network traffic policy profiles.

24. An online credit control system according to claim 18 wherein the policy control command further comprises a network traffic policy profile activation and/or deactivation time parameter.

25. An online credit control system according claim 18 wherein the policy control command further comprises a revalidation time indicating when the PCRF must send a new request for service traffic control.

26. An online credit control system according to claim 18 wherein the first policy control command further comprises a plurality of identifiers identifying a plurality of network traffic policy profiles and a priority value indicating which network traffic policy profile to apply when several are applicable to the service.

* * * * *